US012689644B2

(12) United States Patent
Abbaszadeh et al.

(10) Patent No.: US 12,689,644 B2
(45) Date of Patent: Jul. 21, 2026

(54) SAFETY AND SECURITY OF CYBER-PHYSICAL SYSTEMS CONNECTED THROUGH IoT NETWORK

(71) Applicant: EDISON INNOVATIONS, LLC, Allen, TX (US)

(72) Inventors: Masoud Abbaszadeh, Niskayuna, NY (US); Sm Hasan, Niskayuna, NY (US); Kalpesh Singal, Niskayuna, NY (US); Fernando D'Amato, Niskayuna, NY (US)

(73) Assignee: EDISON INNOVATIONS, LLC, Allen, TX (US)

( * ) Notice: Subject to any disclaimer, the term of this patent is extended or adjusted under 35 U.S.C. 154(b) by 17 days.

(21) Appl. No.: 18/850,484

(22) PCT Filed: Mar. 24, 2023

(86) PCT No.: PCT/US2023/016265
§ 371 (c)(1),
(2) Date: Sep. 24, 2024

(87) PCT Pub. No.: WO2023/183590
PCT Pub. Date: Sep. 28, 2023

(65) Prior Publication Data
US 2025/0227119 A1        Jul. 10, 2025

Related U.S. Application Data

(60) Provisional application No. 63/325,736, filed on Mar. 31, 2022, provisional application No. 63/323,241, filed on Mar. 24, 2022.

(51) Int. Cl.
*H04L 9/40*        (2022.01)

(52) U.S. Cl.
CPC ...... *H04L 63/1425* (2013.01); *H04L 63/1416* (2013.01)

(58) Field of Classification Search
CPC ........................ H04L 63/1425; H04L 63/1416
See application file for complete search history.

(56) References Cited

U.S. PATENT DOCUMENTS 8,468,599 B2    6/2013    McCusker et al.
2018/0330083 A1*    11/2018    Abbaszadeh ............ G06N 5/04
(Continued)

OTHER PUBLICATIONS

International Search Report and Written Opinion for International Patent Application No. PCT/US2023/016265, dated Jul. 3, 2023, 9 pages.

*Primary Examiner* — Viet D Vu
(74) *Attorney, Agent, or Firm* — Ascenda Law Group, PC

(57)        ABSTRACT

A system to protect an asset includes a plurality of monitoring nodes each generating a data stream of current monitoring node values in time-domain. An anomalous space data source stores sets of anomalous feature vectors for each of the plurality of monitoring nodes generated by an anomaly detection model. A current system function processor, coupled to the plurality of monitoring nodes over a network, receives receive data streams from each of the plurality of monitoring nodes, and generates a set of current feature vectors. An anomaly detection computer coupled to the plurality of monitoring nodes receives the data streams from the plurality of monitoring nodes and the set of anomalous feature vectors, and outputs at least one decision boundary based on processing, using the anomaly detection model, of the current feature vectors relative to the sets of anomalous feature vectors.

18 Claims, 10 Drawing Sheets

(56)        References Cited

U.S. PATENT DOCUMENTS

| | | | |
|---|---|---|---|
| 2019/0056722 A1* | 2/2019 | Abbaszadeh | ........... G06F 21/55 |
| 2019/0306187 A1* | 10/2019 | Dyakin | ................... H04L 63/20 |
| 2019/0342318 A1 | 11/2019 | Holzhauer et al. | |
| 2020/0137090 A1 | 4/2020 | Holzhauer et al. | |
| 2020/0292608 A1* | 9/2020 | Yan | .................... G05B 23/0221 |

* cited by examiner

Cyber-Attack

Local Malfunction/Intrusion

Cyber Space

Physical Space with
Sensors, Actuators,
Controllers,
Communication Modules

Wireless Network

Environment

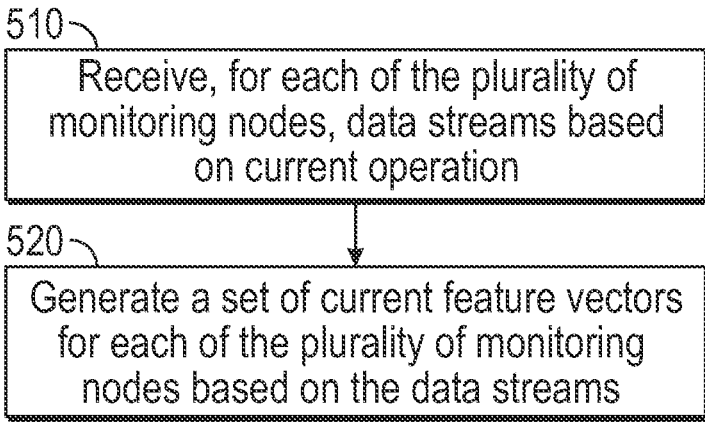

510 — Receive, for each of the plurality of monitoring nodes, data streams based on current operation 520 — Generate a set of current feature vectors for each of the plurality of monitoring nodes based on the data streams

FIG. 5

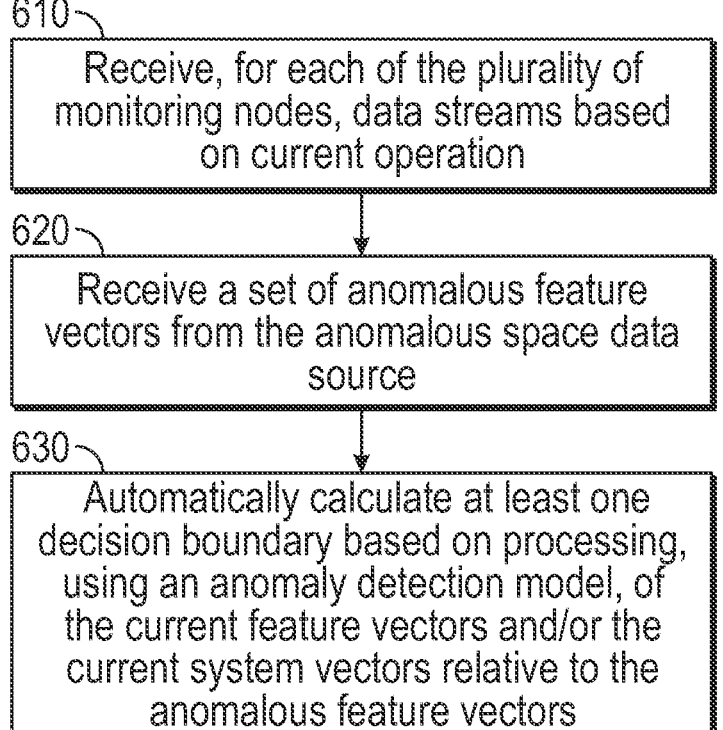

610 — Receive, for each of the plurality of monitoring nodes, data streams based on current operation 620 — Receive a set of anomalous feature vectors from the anomalous space data source 630 — Automatically calculate at least one decision boundary based on processing, using an anomaly detection model, of the current feature vectors and/or the current system vectors relative to the anomalous feature vectors

FIG. 6

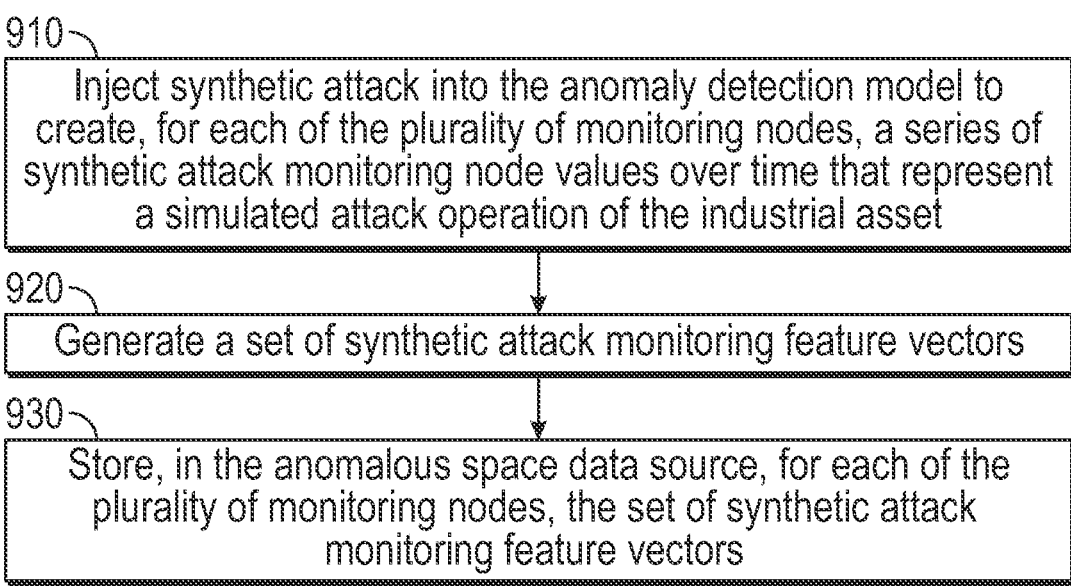

910 ⁓

Inject synthetic attack into the anomaly detection model to create, for each of the plurality of monitoring nodes, a series of synthetic attack monitoring node values over time that represent a simulated attack operation of the industrial asset

920 ⁓

Generate a set of synthetic attack monitoring feature vectors

930 ⁓

Store, in the anomalous space data source, for each of the plurality of monitoring nodes, the set of synthetic attack monitoring feature vectors

FIG. 9

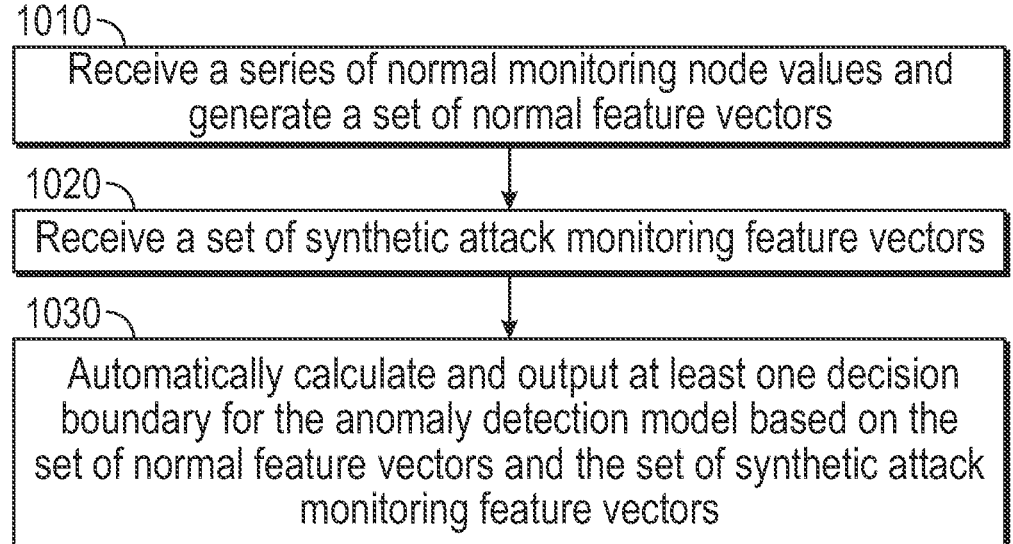

1010 ⁓

Receive a series of normal monitoring node values and generate a set of normal feature vectors

1020 ⁓

Receive a set of synthetic attack monitoring feature vectors

1030 ⁓

Automatically calculate and output at least one decision boundary for the anomaly detection model based on the set of normal feature vectors and the set of synthetic attack monitoring feature vectors

FIG. 10

SAFETY AND SECURITY OF CYBER-PHYSICAL SYSTEMS CONNECTED THROUGH IoT NETWORK

CROSS-REFERENCE TO RELATED APPLICATIONS

This application is a 371 National Entry of International Patent Application No. PCT/US2023/016265 filed Mar. 24, 2023, which claims the benefit of priority to U.S. Provisional Patent Application No. 63/323,241, filed on Mar. 24, 2022, and U.S. Provisional Patent Application No. 63/325,736, filed on Mar. 31, 2022, each of which is incorporated herein by reference in its entirety.

TECHNICAL FIELD

The present description relates generally to security and resilience of cyber-physical systems, and, more particularly, for example, to monitoring of nodes of a cyber-physical system connected in a network to detect, and generate warnings relating to, presence of anomalies and hazards in the cyber-physical system.

BACKGROUND

Networked Control Systems (NSCs) are control systems where the control loops are closed through a communication network. In such systems, necessary signals for the control mission may be exchanged among the system components through a network such as, for example, a wireless network. One of the advantages of such systems is the capability of interconnecting the physical space of the systems to enable the execution of several tasks from long distance. FIG. 1 illustrates an example of a NCS including the environment of the NSC and its basic components. Such NSCs are sometimes referred to as cyber-physical systems (CFS) or multi-agent systems (MAS).

The network connected nature of NCS, while advantageous, also makes them vulnerable to external malicious attacks while sharing information through a wireless network. Malicious attacks on NSCs may often compromise the efficiency of cooperative control algorithms and can lead to heavily degraded performances of the overall system and possibly to catastrophic effects. Consequently, the issue of cyber security in such systems has attracted considerable attention.

System security plays an increasingly enhanced role in the reliability of NCS as it allows for maintaining unbiased user defined coordination between the agents by detecting violating and malicious information. A few potential ways to violate security measures are deception or cyber-attacks. These types of attacks are usually more difficult to identify as they can be coordinated. Some examples of cyberattacks include false data injection attacks (FDIA), denial of service (DOS), replay attacks, etc. Indeed, such types of attacks are aimed at destabilizing the network by injecting control structures with deceptive information. Detecting cyberattacks on cyber-physical systems has thus become a central focus for system security and control.

BRIEF DESCRIPTION OF THE DRAWINGS

Certain features of the subject technology are set forth in the appended claims. However, for purpose of explanation, several aspects of the subject technology are set forth in the following figures.

FIG. 5 illustrates a method of generating current system function parameters that may be performed by the current system function processor described herein, in accordance with at least some embodiments of the present disclosure.

FIG. 6 illustrates a method for calculating a decision boundary, according to at least some embodiments of the present disclosure.

FIG. 9 is a synthetic attack injection method, in accordance with at least some embodiments of the present disclosure.

FIG. 10 illustrates an off-line training process in accordance with at least some embodiments of the present disclosure.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

As noted above, industrial control systems that operate physical systems are increasingly connected to a network, such as, an internet of things (IoT) network using 5G wireless technology. Note that, as used herein, the term "industrial" might be associated with any system that is connected to an external source, e.g., to a network, in the case of a cyber-physical system or locally operating a physical system. The connectedness of such networked control systems renders them increasingly vulnerable to threats and, in some cases, multiple attacks may occur simultaneously. Protecting an asset may depend on detecting anomalous behavior of individual components caused by cyber-based attacks and distinguishing between such attacks and naturally occurring faults and failures. Existing approaches to protect an industrial control system, such as failure and diagnostics technologies, may not adequately address these threats—especially when multiple, simultaneous attacks occur over the network. It would therefore be desirable to protect an industrial asset from cyber threats in an automatic and accurate manner.

Accordingly, the systems, methods and devices for anomaly detection and forecasting described in the present disclosure are designed to enable early detection of hazard, fault and salient and stealthy attacks which could otherwise, remain in the asset for days or even months without being caught. The systems, methods and devices disclosed herein also enable early engagement of the safety chains, system operator or the automatic accommodation in a cyber or hazard incident. Furthermore, the systems, methods and devices disclosed herein can predict future system failures/malfunctions and be used as a tool for predictive health monitoring and prognostics.

Figure 2:
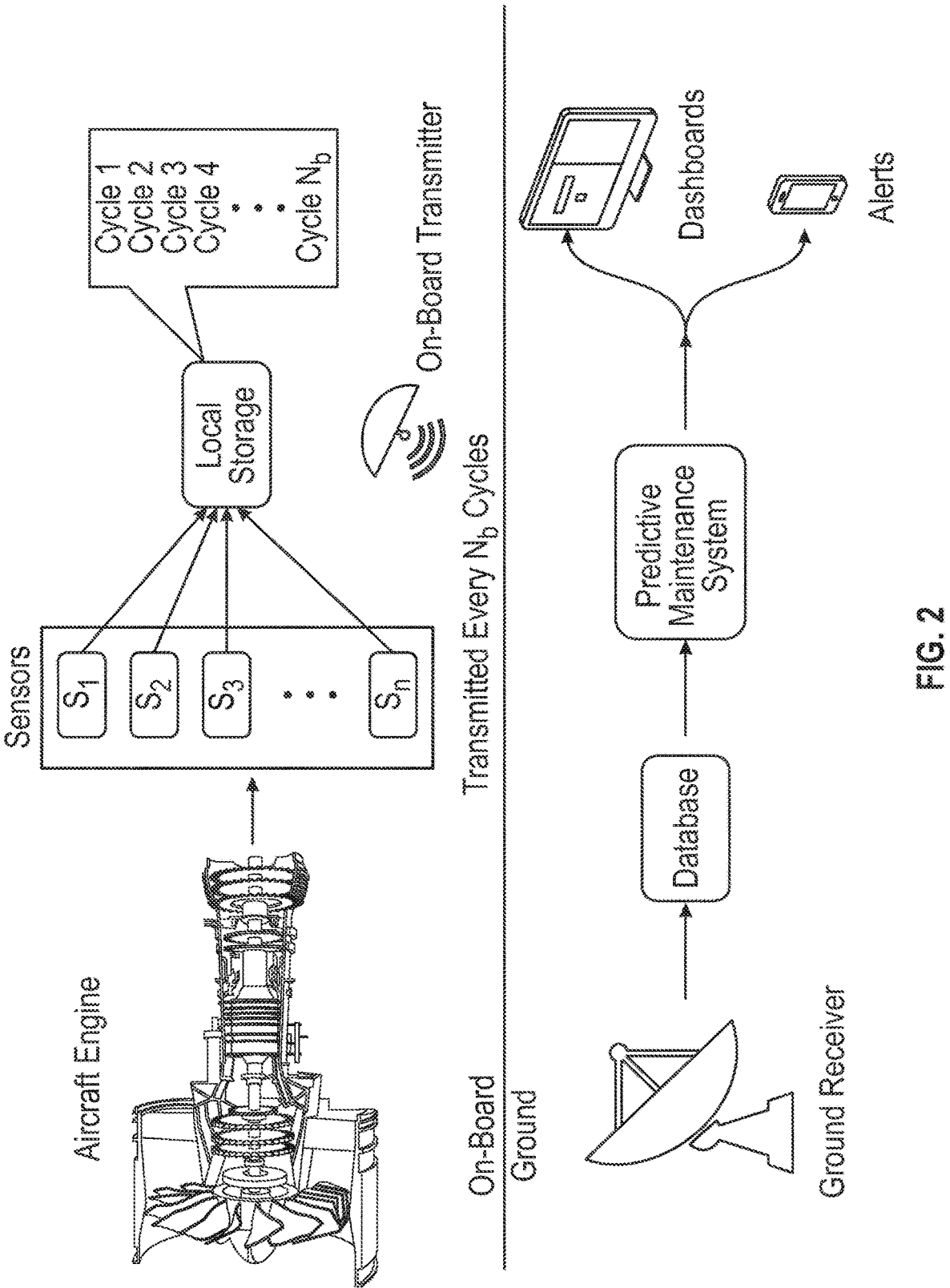
FIG. 2 illustrates an anomaly detection and mitigation system with components connected over a wireless network, in accordance with at least some embodiments of the present disclosure.

FIG. 2 illustrates an anomaly detection and mitigation system with components connected over a wireless network, in accordance with at least some embodiments of the present disclosure. While FIG. 2 shows an aircraft engine as an example of the industrial asset, it will be appreciated that the application of the system is not limited thereto.

As depicted in FIG. 2, the industrial asset includes a plurality of sensors S1, S2, S3 . . . Sn. The industrial asset may also include an on-board transmitter for transmitting data collected by the sensors. In some embodiments, the data collected by each of the sensors is transmitted (after potentially some pre-processing) in real-time, e.g., via a reliable high-speed wireless network such as a 5G network.

In some embodiments, each sensor may be coupled to a local storage to store the data collected by the sensor. In some embodiments, a subset of the plurality of sensors may be coupled to a local storage (instead of each sensor having a local storage). In some embodiments, the data collected by the sensors is stored at the local storage and transmitted (after potentially some pre-processing) periodically, e.g., every N cycles, N being a natural number. In some embodiments, the local storage is coupled to a transmitter for transmitting the stored data to a central database, e.g., via a receiver coupled to the central database.

As depicted in FIG. 2, the central database is on the ground while the local storage and sensors are on the aircraft and associated with the aircraft engine. Thus, the sensors associated with the aircraft engine generate data and periodically (or in real-time) transmit the data to a local storage, which is then consolidated and transmitted, e.g., via a transmitter on-board the aircraft, to a central database via the ground receiver through a high speed and reliable wireless link (such as a 5G network) for further processing. The data may be transferred in real-time, streaming with the same framerate as the collection sampling time, or with some buffering using the local storage (e.g., per flight cycle).

The data collected at the central database is processed to perform operations such as, for example, anomaly/fault detection and isolation, predictive situation awareness, prognostics and health monitoring, safety monitoring, etc., and generate corresponding analytics. The produced analytics (or a subset of them) may be communicated back to the industrial asset (e.g., the jet engine depicted in FIG. 2) for alarm and warning generation, and potential operation and control optimizations. It may also generate early warning of incipient events to the operators.

Figure 3:
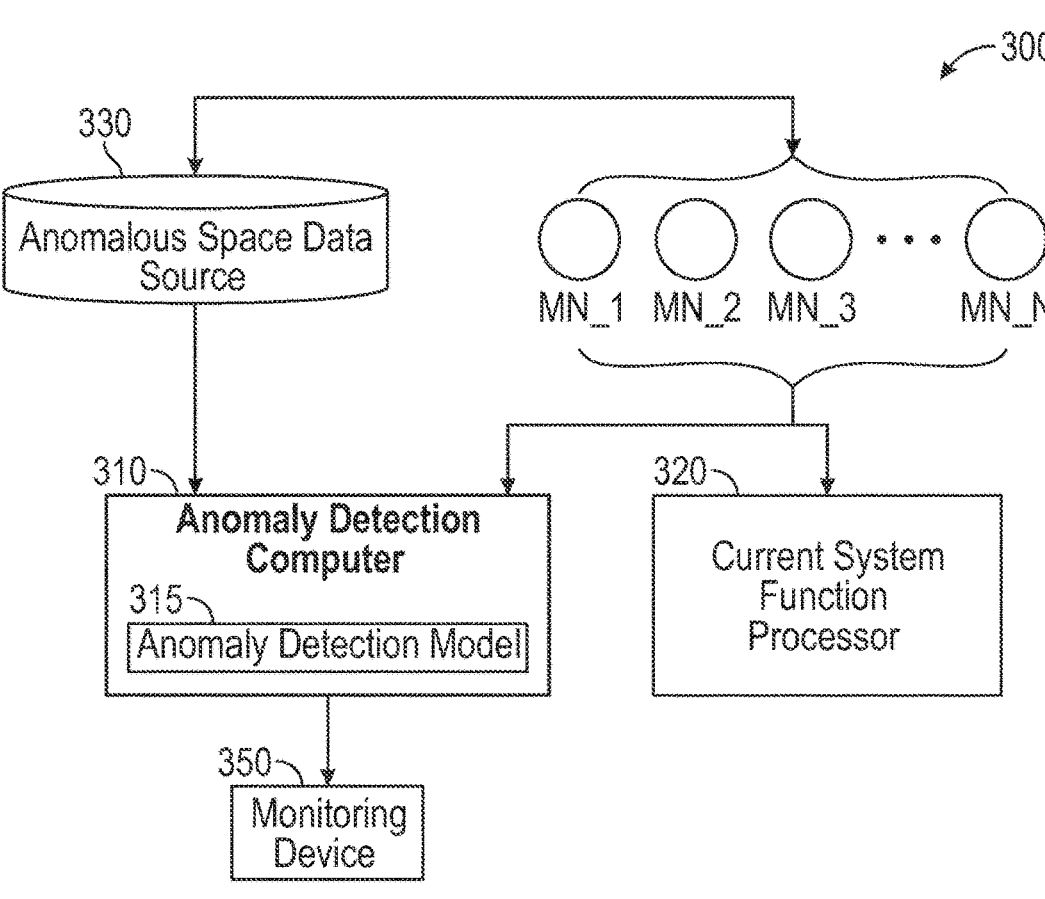
FIG. 3 illustrates an anomaly detection system in accordance with at least some embodiments of the present disclosure.

FIG. 3 illustrates an anomaly detection system 300 in accordance with at least some embodiments of the present disclosure. The anomaly detection system includes an anomaly detection computer 310, a current system function processor 320, an anomalous space data source 330 and a monitoring device 350. The anomalous space data source 330, in some embodiments, includes a central database (not explicitly shown), e.g., such as one depicted in FIG. 2, for collecting data from a plurality of sensors (also referred to herein as monitoring nodes) MN_1, MN_2, MN_3, . . . MN_N.

As used herein, devices, including those associated with the system 300 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The anomaly detection computer 310 processes data from the central database using, e.g., an anomaly detection model 315, to generate an anomalous feature vector for each of the plurality of monitoring nodes. The anomalous feature vectors together define an anomalous space which is stored in the anomalous space data source 330.

The anomaly detection computer 310 may store information into and/or retrieve information from various data stores, such as the anomalous space data source 330 or any of the data sources included within the anomalous space data source such as, a normal space data source (not explicitly shown) for storing sets of normal feature vectors for each of the plurality of monitoring nodes. The various data sources may be locally stored or reside remote from the anomaly detection computer 310. Although a single anomaly detection computer 310 is shown in FIG. 3, any number of such devices may be included. Moreover, various devices described herein might be combined according to embodiments of the present disclosure. For example, in some embodiments, the anomaly detection computer 310 and data sources 330 might comprise a single apparatus. The anomaly detection computer 310 functions may be performed by a constellation of networked apparatuses, in a distributed processing or cloud-based architecture.

A user may access the system 300 via one of the monitoring devices 350 (e.g., a Personal Computer ("PC"), tablet, or smartphone) to view information about and/or manage anomaly detection information in accordance with any of the embodiments described herein. In some cases, an interactive graphical display interface may let a user define and/or adjust certain parameters (e.g., threat detection trigger levels) and/or provide or receive automatically generated recommendations or results from the anomaly detection computer 310.

Thus, the system disclosed herein receives time-series data from a collection of monitoring nodes over the IoT network devices and assets (sensor/actuators/controller nodes), and extracts features from the time series data for each monitoring node. The term "feature" may refer to, for example, mathematical characterizations of data. Examples of features as applied to data might include the maximum and minimum, mean, standard deviation, variance, settling time, Fast Fourier Transform ("FFT") spectral components, linear and non-linear principal components, independent components, sparse coding, deep learning, etc. as outlined in U.S. Pat. No. 9,998,487, which is incorporated herein by reference in its entirety.

The type and number of features for each monitoring node, might be optimized using domain-knowledge, feature engineering, or receiver operating characteristic (ROC) statistics. The features are calculated over a sliding window of the signal time series. The length of the window and the duration of slide are determined from domain knowledge and inspection of the data or using batch processing. The features are computed at the local (associated with each particular monitoring node) and global (associated with the whole asset or a part of the network) levels. The time-domain values of the nodes or their extracted features may be normalized for better numerical conditioning.

Referring back to FIG. 3, the anomaly detection model 315 represents anomalous operation of one or more monitoring nodes and/or anomalous operation of the industrial asset as a whole. It must be noted that the term "anomalous operation" or "anomalous functioning" includes behavior of a monitoring node or the industrial asset as a whole that is different from what would typically be considered as normal or expected operational behavior and may be caused either by natural malfunctioning or failure or because of an ongoing or an impending attack or threat on one or more monitoring nodes and/or the industrial asset as a whole.

In some embodiments, the anomaly detection model 315 may include a plurality of sub-models, each representing anomalous operation of one or more monitoring nodes and/or the industrial asset over a different time scale. Thus, for example, the anomaly detection model 315 may include a sub-model representing anomalous operation over several seconds, a sub-model representing anomalous operation over several minutes or hours, and a sub-model representing anomalous operation over several days or weeks.

In some embodiments, the anomaly detection model includes at least one sub-model based on historical operation of the plurality of monitoring nodes and the industrial asset. In some embodiments, the at least one sub-model based on historical operation is based on historically normal operation of the plurality of monitoring nodes and/or the industrial asset. In such embodiments, the system may further include a normal space data source (not explicitly shown) for storing sets of normal feature vectors for each of the plurality of monitoring nodes generated by the at least one sub-model based on historically normal operation of the plurality monitoring nodes and the industrial asset.

Figure 4:
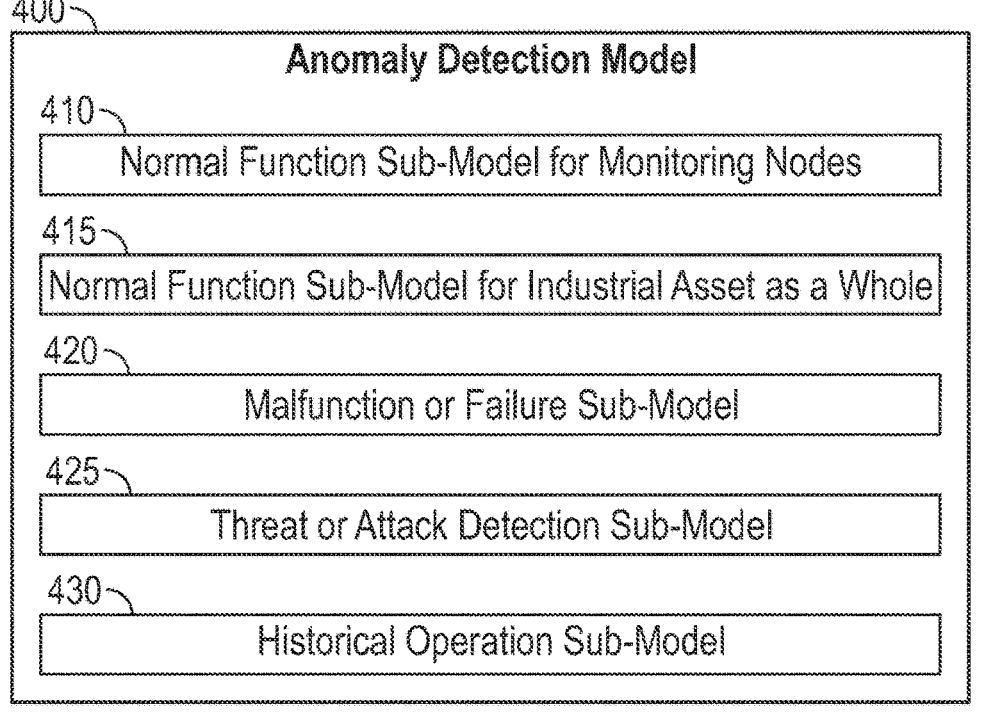
FIG. 4 illustrates an example of the anomaly detection model in accordance with at least some embodiments of the present disclosure.

FIG. 4 illustrates an example of the anomaly detection model in accordance with at least some embodiments of the present disclosure. The anomaly detection model 400 may, thus, include a normal function sub-model for the plurality of monitoring nodes 410, a normal function sub-model for the industrial asset as a whole 415, a malfunction or failure detection sub-model 420, a threat or attack detection sub-model 425, and a historical operation sub-model 430.

In some embodiments, the method may include obtaining an input dataset from a plurality of nodes (e.g., the nodes, such as sensors, actuators, or controller parameters; the nodes may be physically co-located or connected through a wired or wireless network (in the context of 5G/IoT)) of industrial assets. The method may also include predicting a fault node in the plurality of nodes by inputting the input dataset to a one-class classifier (e.g., using a reconstruction model).

The one-class classifier is trained on normal operation data (e.g., historical field data or simulation data) obtained during normal operations (e.g., no cyber-attacks) of the industrial assets. In some embodiments, the method may further include computing a confidence level (e.g., using the confidence predictor module) of cyber fault detection for the input dataset using the one-class classifier. A decision threshold may be adjusted based on the confidence level computed by the confidence predictor for categorizing the input dataset as normal or including a cyber-fault. The cyber-fault is detected in the plurality of nodes of the industrial assets based on the predicted fault node and the adjusted decision threshold.

In some embodiments, the method may further include computing reconstruction residuals (e.g., using the reconstruction model) for the input dataset such that the residual is low if the input dataset resembles the normal operation data, and high if the input dataset does not resemble the historical field data or simulation data. Detecting cyber-faults in the plurality of nodes includes comparing the decision thresholds to the reconstruction residuals to determine if a datapoint in the input dataset is normal or anomalous.

In some embodiments, the one-class classifier is a reconstruction model (e.g., a deep autoencoder, a GAN, or a combination or PCA-inverse PCA, depending on the number of nodes) configured to reconstruct nodes of the industrial assets from the input dataset, using (i) a compression map that compresses the input dataset to a feature space, and (ii) a generative map that reconstructs the nodes from latent features of the feature space.

In some embodiments, the method may further include: designating boundary conditions (e.g., ambient conditions) and/or hardened sensors to compute location of the input dataset with respect to a training dataset used to train the one-class classifier, for computing the confidence level of cyber fault detection using the one-class classifier. In absence of that, all attacks would likely be classified as a sparse region or extrapolation from training set. If most of the attacks are accompanied by lower confidence predictions, they would be evaluated against relaxed thresholds, leading to a lower TPR. As described above, hardened sensors are physically made secure by using additional redundant hardware. The probability that those sensors are attacked is very low. Some embodiments determine the confidence metric so as to avoid this undesirable scenario.

In some embodiments, the anomaly detection model 315 is generated and/or refined by the anomaly detection computer 310. FIG. 5 illustrates a method of generating current system function parameters that may be performed by the current system function processor 320 described herein, such as the anomaly detection computer 310.

The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 510, the system may retrieve, for each of a plurality of monitoring nodes, a data stream of current monitoring node values that represent current operation of the industrial asset control system. At 520, based on the data streams, a set of current feature vectors may be generated.

FIG. 6 illustrates a method of generating a decision boundary that may be performed by an anomaly detection computer, in accordance with at least some embodiments of the present disclosure. The series of normal (i.e., nonanomalous) and/or anomalous values might be obtained, for example, by running Design of Experiments ("DoE") on an industrial control system associated with a power turbine, a jet engine, a locomotive, an autonomous vehicle, etc.

At 610, the system may retrieve, for each of a plurality of monitoring nodes, a data stream of current monitoring node values that represent current operation of the industrial asset control system. At 620, the system may retrieve a set of anomalous feature vectors for each of the plurality of monitoring nodes from the anomalous space data source.

At 630, a decision boundary may be automatically calculated and output, by processing, using the anomaly detection model, the current feature vectors relative to the anomalous feature vectors. According to some embodiments, the decision boundary might be associated with a line, a hyperplane, a non-linear boundary separating normal space from threatened space, and/or a plurality of decision boundaries. Moreover, a decision boundary might comprise a multi-class decision boundary separating normal space and anomalous space (including, e.g., a degraded operation space). In addition, note that the anomaly detection model might be associated with the decision boundary, feature mapping functions, and/or feature parameters.

The decision boundary can then be used to detect cyber-attacks. For example, in some embodiments, the result of processing by the anomaly detection model may be processed to transmit a threat alert signal based on the set of current feature vectors and a decision boundary when appropriate (e.g., when component failure is detected, or a cyber-attack is detected). According to some embodiments, one or more response actions may be performed when a threat alert signal is transmitted. For example, the system might automatically shut down all or a portion of the industrial asset control system (e.g., to let the detected potential cyber-attack be further investigated). As other examples, one or more parameters might be automatically modified, a software application might be automatically triggered to capture data and/or isolate possible causes, etc.

Some embodiments described herein may take advantage of the physics of a control system by learning a priori from tuned high fidelity equipment models and/or actual "on the job" data to detect single or multiple simultaneous adversarial threats to the system. Moreover, according to some embodiments, all monitoring node data may be converted to features using advanced feature-based methods, and the real-time operation of the control system may be monitoring in substantially real-time. Abnormalities may be detected by classifying the monitored data as being "normal" or disrupted (or degraded). Disrupted data may be further classified as being based on a component malfunction and/or failure, or based on a threat or attack. Thus, the decision boundary may be based on a probability that a detected anomaly is a malfunction and/or a failure of one or more monitoring nodes, and/or a probability that the detected anomaly is an attack and/or a threat. This decision boundary may be constructed using dynamic models and may help enable early detection of vulnerabilities (and potentially avert catastrophic failures) allowing an operator to restore the control system to normal operation in a timely fashion.

Note that an appropriate set of multi-dimensional feature vectors, which may be extracted automatically (e.g., via an algorithm) and/or be manually input, might comprise a good predictor of measured data in a low dimensional vector space. According to some embodiments, appropriate decision boundaries may be constructed in a multi-dimensional space using a data set which is obtained via scientific principles associated with DoE techniques. Moreover, multiple algorithmic methods (e.g., support vector machines, machine learning techniques, or artificial intelligence models) may be used to generate decision boundaries.

Since boundaries may be driven by measured data (or data generated from high fidelity models), defined boundary margins may help to create a threat zone in a multi-dimensional feature space. Moreover, the margins may be dynamic in nature and adapted based on a transient or steady state model of the equipment and/or be obtained while operating the system as in self-learning systems from incoming data stream.

Non-limiting examples of machine learning models that may be used for generating decision boundaries include supervised learning models such as neural networks, support vector machine, logistic regression, random forest models and decision tree algorithms; unsupervised learning models such as K-means clustering, principal component analysis, hierarchical clustering and semantic clustering; and semi-supervised learning models such as generative adversarial networks. According to some embodiments, a training method may be used for supervised learning to teach decision boundaries. This type of supervised learning may take into account on operator's knowledge about system operation (e.g., the differences between normal and abnormal operation).

In some embodiments, the determination of the probability values that a detected anomaly is a malfunction and/or a failure of one or more monitoring nodes, and/or the probability values that the detected anomaly is an attack and/or a threat may be provided to the anomaly detection model. In some embodiments, the anomaly detection model may determine the probability values that a detected anomaly is a malfunction and/or a failure of one or more monitoring nodes, and/or the probability values that the detected anomaly is an attack and/or a threat using stochastic models based on the physics of the monitoring nodes. In either instance, the probability values may be used for training the machine learning model that generates the decision boundaries.

In some embodiments, the decision boundaries are generated using an artificial intelligence model by, for example, recognizing patterns in feature vectors (e.g., based on temporal changes in feature vectors) as being normal or anomalous. In some embodiments, the artificial intelligence model may be further trained to recognize patterns in feature vectors that are anomalous because of a fault or malfunction at one or more monitoring nodes and patterns in feature vectors that are anomalous because of a threat or an attack on one or more monitoring nodes and/or a threat or an attack on the system.

In some implementations of the present disclosure, the distribution, transfer and training of the machine learning and/or artificial intelligence models (also referred to herein as the "AI/ML models") for various applications may be governed by the protocols associated with the network (e.g., a 5G network) underlying the monitoring nodes. For example, the operation logic associated with the AI/ML models may be controlled by an application function which send requests to the network in accordance with the network protocols.

In this context, in some embodiments, the traffic associated with implementation of the AI/ML models, i.e. data or ML model for AI/ML operations in application layer, can be transmitted as specific quality of service (QOS) flow(s) which is/are different from the QoS flows used for common application data (i.e. non-AI/ML related data over the application layer). Thus, the network data analytics function (NWDAF) can collect data and derive analytics information on the QoS flow(s) for transmission of the traffic associated with the AI/ML models, and based on the analytics information the session management function (SMF) may perform traffic routing optimization for the traffic associated with the AI/ML models. Specific examples of such implementations using a 5G network may be found in the 3GPP Technical Report 3GPP TR 23.700-80 v1.10 (2022-10) Release 18, which is incorporated by reference in its entirety.

Figure 7:
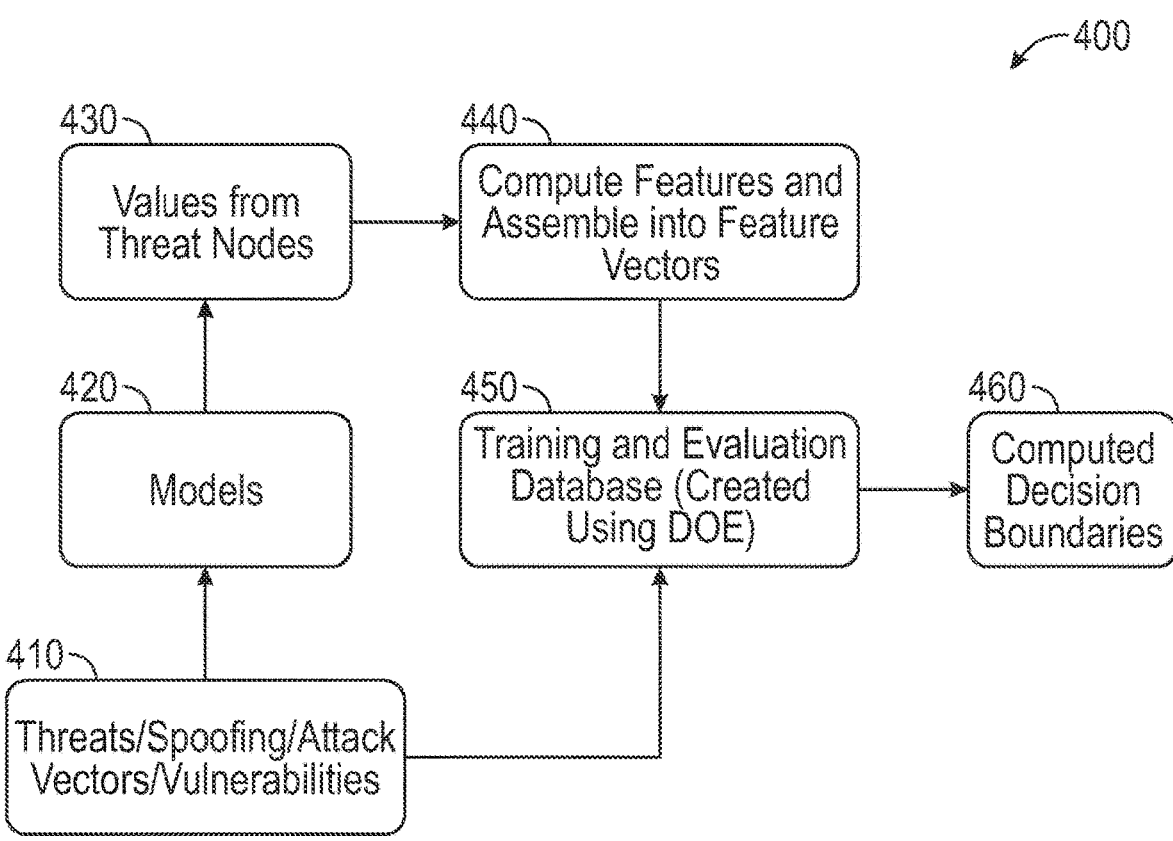
FIG. 7 illustrates an off-line process for generating decision boundary, in accordance with at least some embodiments of the present disclosure.

FIG. 7 illustrates an off-line boundary creation process 400 in accordance with some embodiments. Information about threats, spoofing, attack vectors, vulnerabilities, etc. 410 may be provided to models 420 and/or a training and evaluation database 450 created using DoE techniques. The models 420 may, for example, simulate data 430 from threat nodes (i.e., subset of monitoring nodes that may be considered vulnerable to threats and/or attacks) to be used to compute features that are assembled into a feature vector 440 to be stored in the training and evaluation database 450. The data in the training and evaluation database 450 may then be used to compute decision boundaries 460 to distinguish between normal operation and threatened operation. According to some embodiments, the process 400 may include a prioritization of threat nodes and anticipated threat vectors (i.e., anomalous feature vectors that may be classified as being the result of a threat or an attack based on e.g., analysis of historical operation) to form one or more data sets to develop decision boundaries. Threat vectors are abnormal values at critical inputs where malicious attacks can be created at the domain level that will make the system go into threatened/abnormal space (i.e., a subset of the anomalous space formed based on threat vectors). In addition, the models 420 may comprise high fidelity models that can be used to create a data set (e.g., a set that describes threat space as "levels of threat conditions in the system versus quantities from the threat nodes").

The data 430 from the threat nodes might be, for example, quantities that are captured for a length of from a period of time (e.g., ranging from several seconds to several hours) from sensor nodes, actuator nodes, and/or controller nodes (and a similar data set may be obtained for "levels of normal operating conditions in the system versus quantities from the threat nodes"). This process will result in data sets for "threat space" and "normal space." The quantities captured over the period of time may be used to compute features 440 using feature engineering to create feature vectors. These feature vectors can then be used to obtain a decision boundary that separates the data sets for threat space and normal space (used to detect an anomaly such as a cyber-attack).

Since attacks might be multi-prong (e.g., multiple attacks might happen at once), DoE experiments may be designed to capture the attack space (e.g., using full factorial, Taguchi screening, central composite, and/or Box-Behnken). When models are not available, these DoE methods can also be used to collect data from real-world asset control system. Experiments may run, for example, using different combinations of simultaneous attacks. Similar experiments may be run to create a data set for the normal operating space. According to some embodiments, the system may detect "degraded" or faulty operation as opposed to a threat or attack. Such decisions may require the use of a data set for a degraded and/or faulty operating space.

Figure 8:
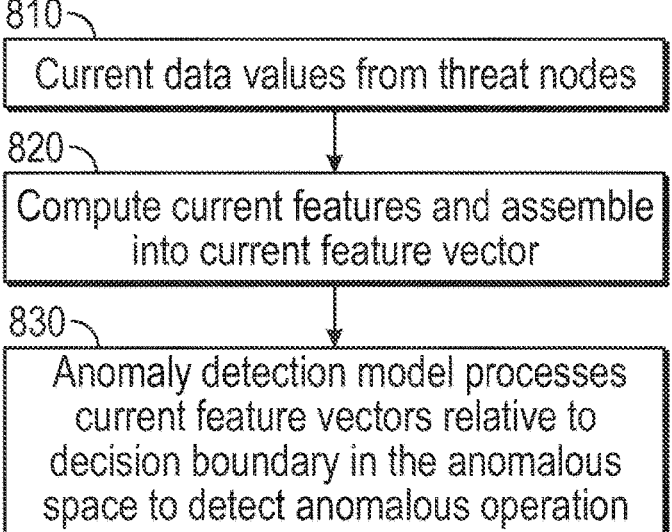
FIG. 8 illustrates a real-time process for protecting an industrial asset, in accordance with at least some embodiments of the present disclosure.

FIG. 8 illustrates a real-time process to protect an industrial asset control system according to some embodiments. At 810, current data from threat nodes may be gathered (e.g., in batches of from several seconds). At 820, the system may compute features and form feature vectors. For example, the system might use weights from a principal component analysis as features. At 830, an anomaly detect model may process the current features vectors relative to the decision boundary in the anomalous space to detect anomalous operation. According to some embodiments, threat node data from models (or from real systems) may be expressed in terms of features since features are a high level representation of domain knowledge and can be intuitively explained. Moreover, embodiments may handle multiple features represented as vectors and interactions between multiple sensed quantities might be expressed in terms of "interaction features."

Note that many different types of features may be utilized in accordance with any of the embodiments described herein, including principal components (weights constructed with natural basis sets) and statistical features (e.g., mean, variance, skewness, kurtosis, maximum, minimum values of time series signals, location of maximum and minimum values, independent components, etc.). Other examples include deep learning features (e.g., generated by mining experimental and/or historical data sets) and frequency domain features (e.g., associated with coefficients of Fourier or wavelet transforms). Embodiments may also be associated with time series analysis features, such as cross-correlations, auto-correlations, orders of the autoregressive, moving average model, parameters of the model, derivatives and integrals of signals, rise time, settling time, neural networks, etc. Still other examples include logical features (with semantic abstractions such as "yes" and "no"), geographic/position locations, and interaction features (mathematical combinations of signals from multiple threat nodes and specific locations). Embodiments may incorporate any number of features, with more features allowing the approach to become more accurate as the system learns more about the physical process and threat. According to some embodiments, dissimilar values from threat nodes may be normalized to unit-less space, which may allow for a simple way to compare outputs and strength of outputs.

Since some connected assets might be very complex or have too many variants, data-driven digital twins may be utilized for to generate normal/abnormal training datasets as described in U.S. Pat. No. 10,671,060, which is incorporated herein by reference in its entirety.

Furthermore, if any domain-knowledge if available (e.g., from physics, biology, etc.), it can be combined into the digital twin as a hybrid model. The system may comprise of off-line (training) and on-line (operation) modules. During the off-line training, the monitoring node data sets are used for feature engineering and decision boundary generation. The online module is run in real-time to compare the node measurements (converted into the feature space) against the decision boundary and provide system status (normal, abnormal).

In some embodiments, the anomaly detection model may be trained based on a set of simulated attacks on the system. The simulation may be performed by injecting a synthetic attack on the system. FIG. 9 is a synthetic attack injection method in accordance with some embodiments. At 910, at least one synthetic attack may be injected into the anomaly detection model to create, for each of a plurality of monitoring nodes, a series of synthetic attack monitoring node values over time that represent simulated attacked operation of the industrial asset. At 920, a set of synthetic attack monitoring feature vectors may be generated based on processing of the synthetic attack monitoring node values using the anomaly detection model. At 930, the system may store, for each of the plurality of monitoring nodes, the set of synthetic attack monitoring feature vectors.

FIG. 10 illustrates a model creation method that might be performed by some or all of the elements of the system described herein. At 1010, the system may retrieve, for each of a plurality of monitoring nodes, a series of normal values over time that represent normal operation of the industrial asset and a set of normal feature vectors may be generated. At 1020 the system may retrieve, for each of the plurality of monitoring nodes, a set of synthetic attack monitoring feature vectors. At 1030, a decision boundary may be automatically calculated and output for the anomaly detection model based on the sets of normal feature vectors, the synthetic attack monitoring feature vectors, and fault feature vectors. According to some embodiments, the decision boundary might be associated with a line, a hyperplane, a non-linear boundary separating normal space from attacked space, and/or a plurality of decision boundaries.

Thus, by training the anomaly detection model using various synthetic attack scenarios, the system disclosed herein can be provided with the capability to detect incipient events. The predicted detection models can run in predictive mode. Some examples of the anomaly forecasting methods that can be used with the system disclosed herein are described in U.S. Pat. No. 10,826,932, which is incorporated herein by reference in its entirety.

Consequently, the system described herein provides for anomaly forecasting in cyber-physical systems connected through IoT (e.g., over a 5G network) for security-oriented cyber-attack detection, localization and early warning. The system and methods disclosed herein are based on forecasting the outputs of cyber-physical system monitoring nodes, using feature-driven dynamic models (e.g., the anomaly detection model described herein) in various different timescales such as, for example, short-term (seconds ahead), mid-term (minutes ahead) and long term (hours to days ahead). The forecasted outputs can be passed to the global and localized attack detection methods to predict upcoming anomalies and generate early warning at different time scales. The early warning may be informed to the system operator and may also be used for early engagement of the automatic attack accommodation remedies.

The system described herein can function using the same sampling rate as the network bandwidth, enabling rapid detection and prediction of anomalous operation. Thus, advantageously, the system can work both deterministic and stochastic data flows and also multi-rate data. As part of the data pre-processing, in some embodiments, the system can synchronizes the data collected from the monitoring node (received with potentially different time-delays) using the last available data from each node and down samples higher rate data to a uniform comment sampling time.

In addition, the system connectivity may potentially also connect to the safety and supervision mechanisms in the network (e.g., a factory process to shut down the hazard). For example, once an electrical incident is detected, the power of the machine may be turned off automatically, or in a welding incident, the welding gun may discontinue, etc. to avoid further injury to the people adjacent to the machine or others.

In some embodiments, all data communication between various components of the system may be performed over encrypted channels.

Figure 1:
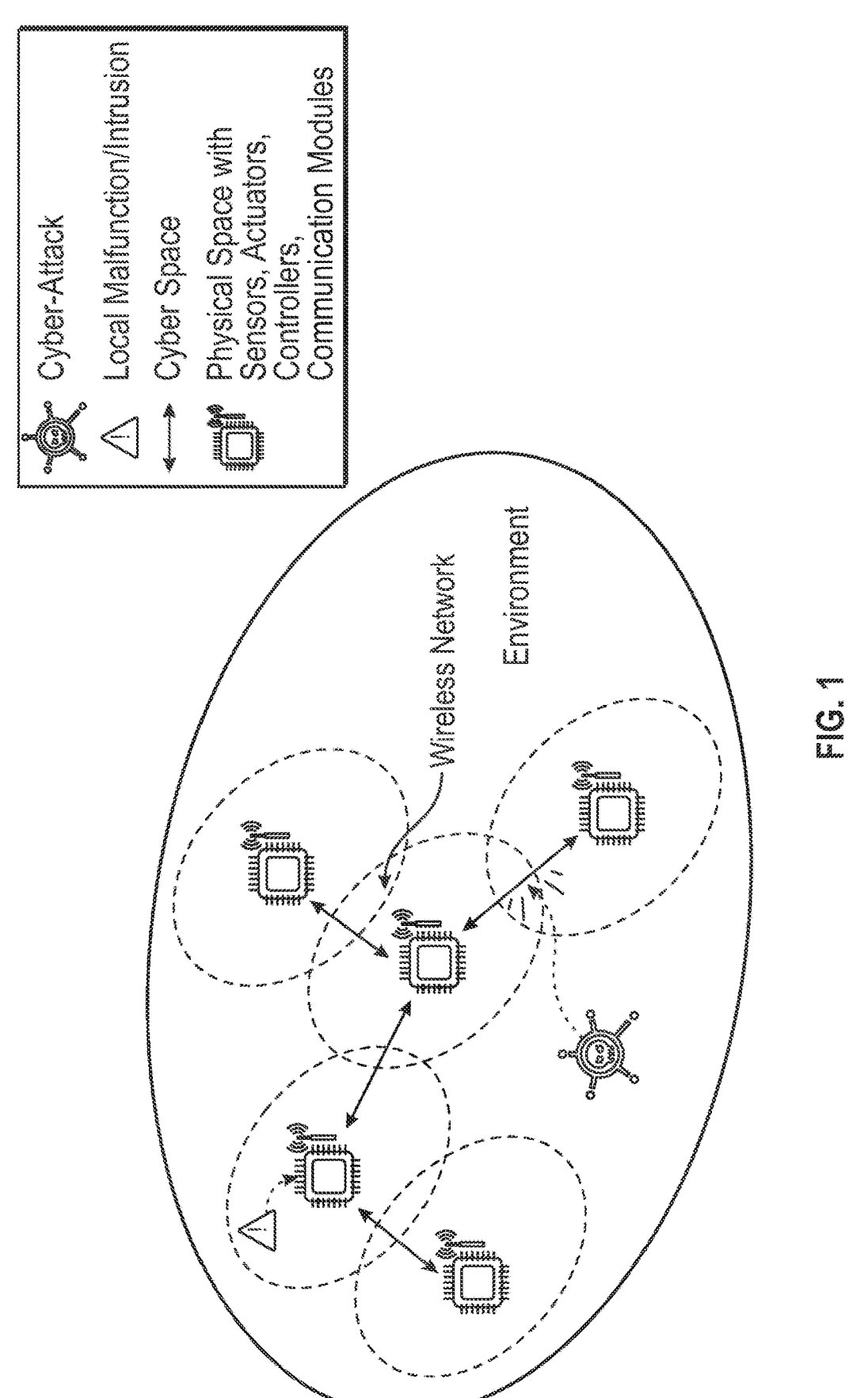
FIG. 1 illustrates a network control system (NCS), basic components of the NCS, cyber-physical layers and possible attack types.
Figure 11:
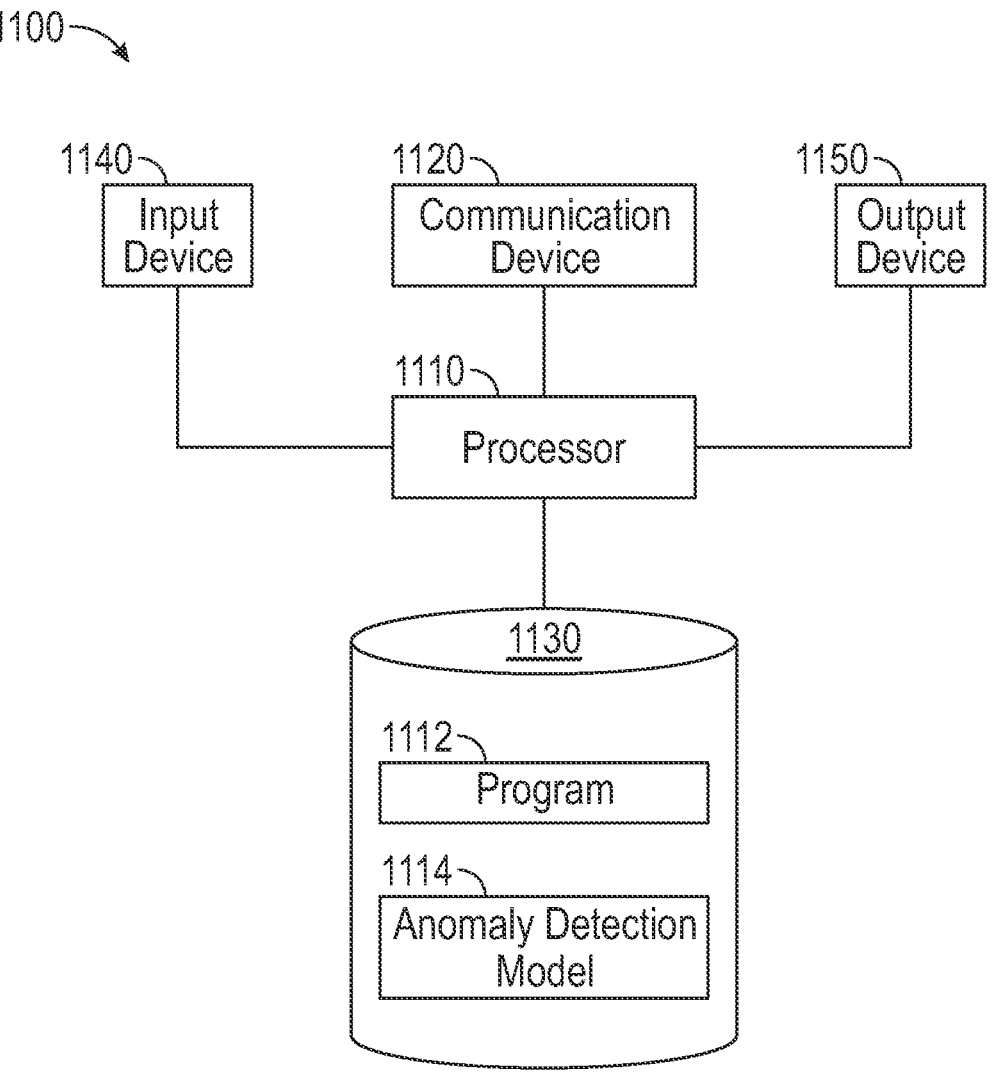
FIG. 11 illustrates an electronic system with which one or more embodiments of present disclosure may be implemented.

The embodiments described herein may be implemented using any number of different hardware configurations. For example, FIG. 11 is a block diagram of an industrial asset control system protection platform 1100 that may be, for example, associated with the system 100 of FIG. 1. The industrial asset control system protection platform 1100 comprises a processor 1110, such as one or more commercially available Central Processing Units ("CPUs") in the form of one-chip microprocessors, coupled to a communication device 1120 configured to communicate via a communication network (not shown in FIG. 11). The communication device 1120 may be used to communicate, for example, with one or more remote monitoring nodes, user platforms, digital twins, etc. The industrial asset control system protection platform 1100 further includes an input device 1140 (e.g., a computer mouse and/or keyboard to input adaptive and/or predictive modeling information) and/ an output device 1150 (e.g., a computer monitor to render a display, provide alerts, transmit recommendations, and/or create reports). According to some embodiments, a mobile device, monitoring physical system, and/or PC may be used to exchange information with the industrial asset control system protection platform 1100.

The processor 1110 also communicates with a storage device 1130. The storage device 1130 may comprise any appropriate information storage device, including combinations of magnetic storage devices (e.g., a hard disk drive), optical storage devices, mobile telephones, and/or semiconductor memory devices. The storage device 1130 stores a program 1112 and/or a anomaly detection model 1114 for controlling the processor 1110. The processor 1110 performs instructions of the programs 1112, 1114, and thereby operates in accordance with any of the embodiments described herein. For example, the processor 1110 may access a normal space data source that stores, for each of a plurality of threat nodes, a series of normal threat node values that represent normal operation of an industrial asset control system. The processor 1110 may also access an anomalous space data source that stores a series of threatened monitoring node values. The processor 1110 may generate sets of normal and anomalous feature vectors and calculate and output a decision boundary for an anomaly detection model based on the normal and anomalous feature vectors. The plurality of monitoring nodes may then generate a series of current monitoring node values that represent a current operation of the asset control system. The processor 1110 may receive the series of current values, generate a set of current feature vectors, execute the anomaly detection model, and transmit a threat alert signal based on the current feature vectors and the decision boundary.

The programs 1112, 1114 may be stored in a compressed, uncompiled and/or encrypted format. The programs 1112, 1114 may furthermore include other program elements, such as an operating system, clipboard application, a database management system, and/or device drivers used by the processor 1110 to interface with peripheral devices.

As used herein, information may be "received" by or "transmitted" to, for example: (i) the industrial asset control system protection platform 1100 from another device; or (ii) a software application or module within the industrial asset control system protection platform 1100 from another software application, module, or any other source.

In some embodiments (such as the one shown in FIG. 11), the storage device 1130 further stores an anomalous space data source. Note that the database described herein is only one example, and additional and/or different information may be stored therein. Moreover, various databases might be split or combined in accordance with any of the embodiments described herein.

Some implementations include electronic components, such as microprocessors, storage and memory that store computer program instructions in a machine-readable or computer-readable medium (also referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; e.g., feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; e.g., by sending web pages to a web browser on a user's client device in response to requests received from the web browser.

Aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

In various embodiments, the communication networks may be implemented using 5G wireless technology, which includes standards for cyber-physical systems security, vertical control applications and Internet of Things (IoT). For example, the 3GPP TR 22.832 V17.10 (2019-12) (cyber-physical control applications), sections 5.5.6 and 5.5.6 detail standards relating to expected network actions when detecting malicious or unexpected communications. Similarly, 3GPP TS 22.104 (2020-09) (cyber-physical control applications), section A.4.4 details standards relating to distributed automated switching for isolation and service restoration. Likewise, 3GPP TS 33.501 V16.1.0 (2019-12) (5G security), section 5.3.3 details standards relating to integrity protection, detection/isolation of malicious EUs. Each of these documents are incorporated herein by reference in their entirety.

EXAMPLES

Example 1: Connected Medical Devices and Wearables

Worksites and other locations may include various hazards that may not be visible or readily apparent to individuals at the site but may be detected through the use of sensors. However, a single sensor measurement is generally insufficient to determine whether hazardous conditions are present, and if they are, to what degree the conditions pose a risk of danger or injury to individual workers. Conventional systems generally do not aggregate multiple sensor measurements or measurements of different types, which limits the ability of current systems to use sensors to determine when hazards are present, to determine the nature of such hazards, and to generate corresponding alerts when hazards are detected. An improved system for generating alerts based on worksite sensor measurements is therefore desirable. Applications include connected medical devices and wearable devices measuring vital signals for wireless patient monitoring.

Figure 12:
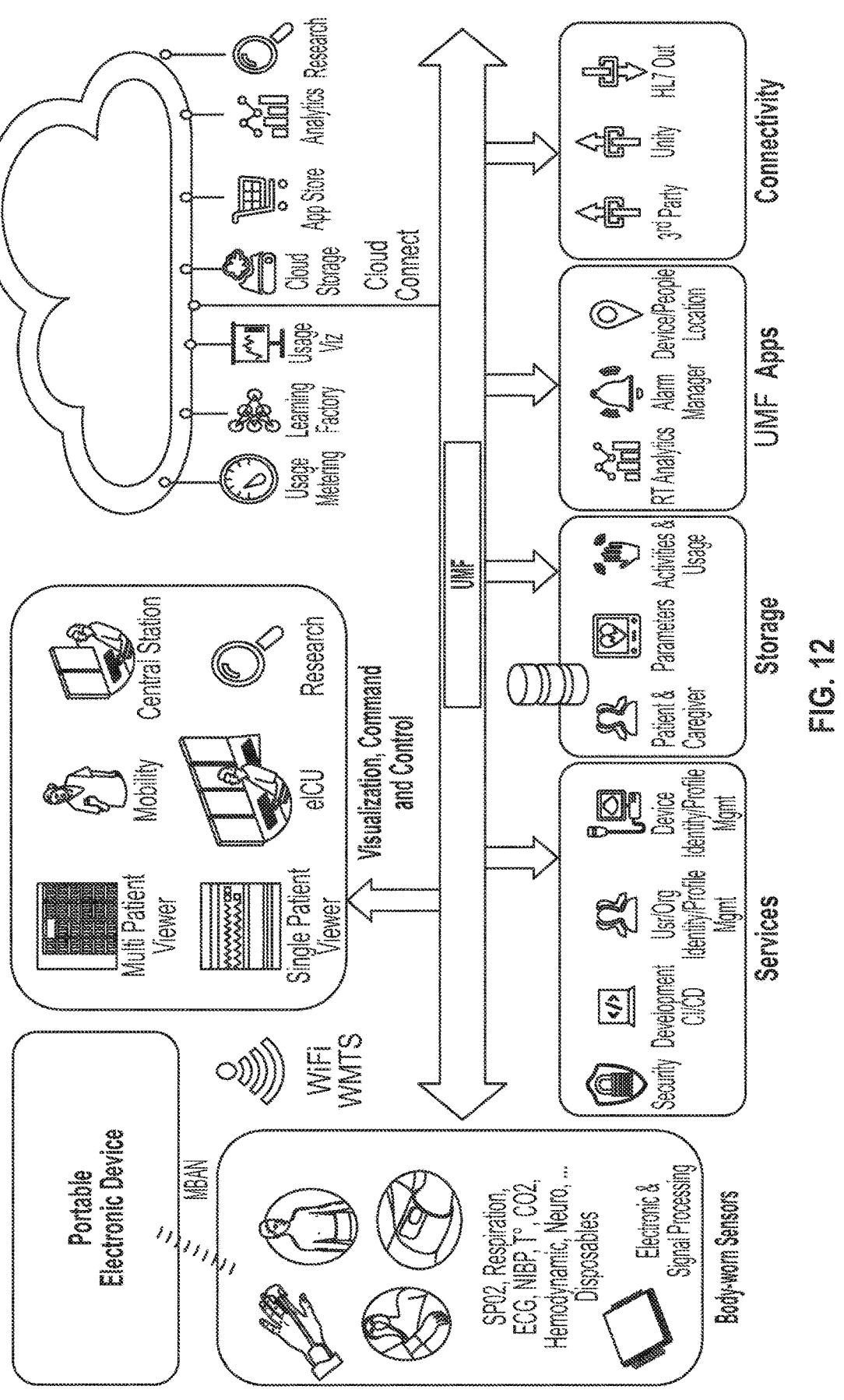
FIG. 12 illustrates a mobile digital health ecosystem as a use case for at least some embodiments of the present disclosure.

Wireless patient monitoring systems are becoming increasingly based on body worn sensors, which collect, process and transmit patient's physiological data to the data gathering device. Wireless patient monitoring solutions based on medical body area networks (MBANs) are changing in many ways how the patients in hospitals are monitored. The major advantages of wireless body-worn sensors over traditional sensors with cables lie in improved infection control, reduction of cable clutter, higher patient mobility and easier access of the patient by the caregiver. At the same time, there are several critical challenges that must be addressed in the design of the medical body area network in order to achieve the level of data transmission reliability that is comparable with cable-based solutions. Since MBANs are used for communication of medical data, data loss should not be tolerated. Also, the body-worn sensors are battery powered, meaning that they need to minimize the power consumption in order to provide necessary level of functionality for a prolonged amount of time. A body-worn sensor contains a physiological sensor, a battery, a processor and a radio. The radio communication requires a significant power, so it is important to limit the radio activity in order to reduce power consumption by the radio. In addition, busy sensor networks are oftentimes used for real-time patient monitoring in hospitals. Thus, they need to be able to reliably provide physiological data while satisfying strict data latency constraints. FIG. 12 illustrates the mobile digital health ecosystem which is a use case subject of the present disclosure. Thus, monitoring of the mobile digital health ecosystem illustrated in FIG. 12 can be performed using any of the systems and methods disclosed herein.

Example 2: Wind Farm Control System

Figure 13:
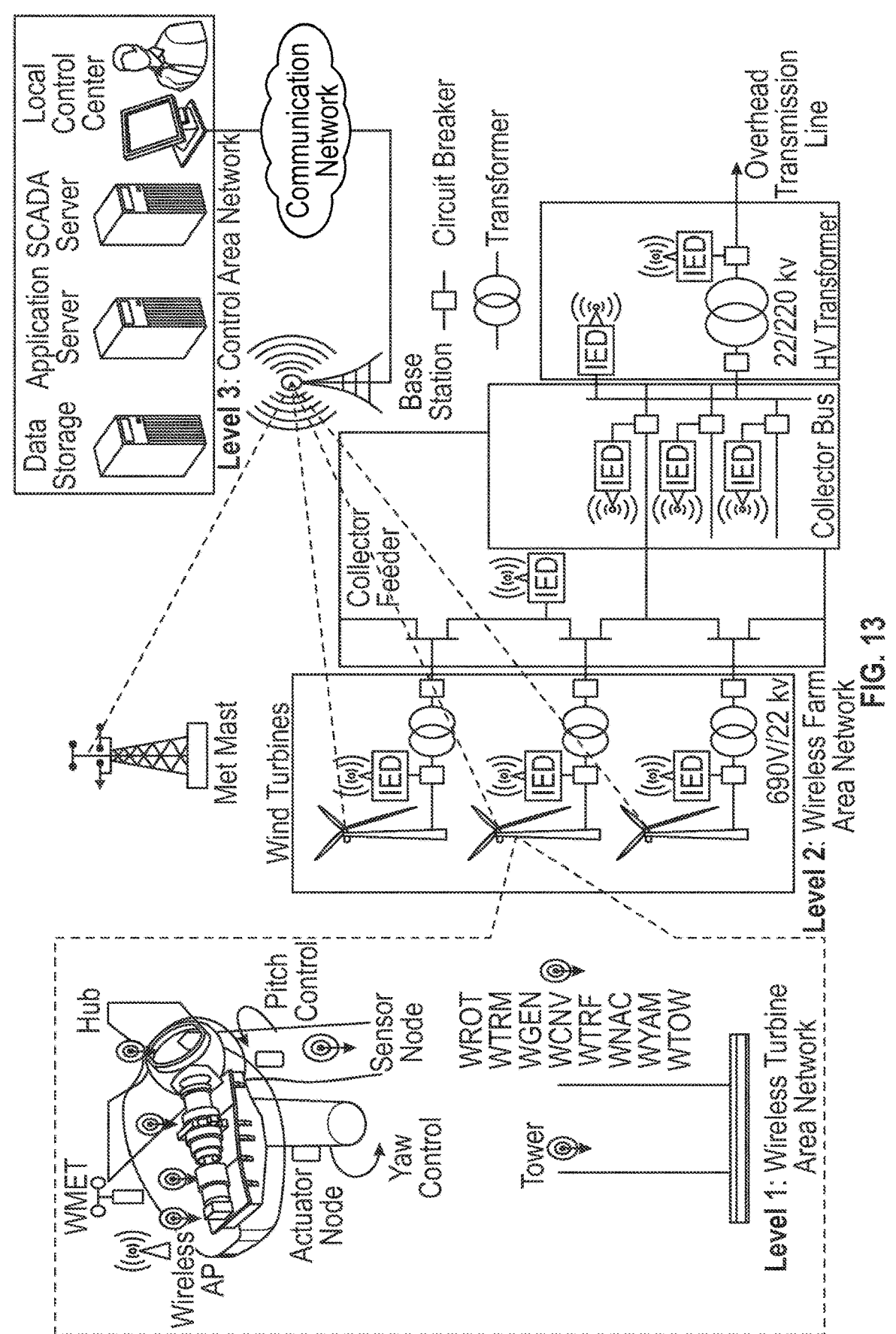
FIG. 13 illustrates a wireless network architecture for control of a wind power farm as a use case for at least some embodiments of the present disclosure.

A typical wind power farm (WPF) consists of wind turbines, meteorological masts, a substation and a control center. Communication networks play an important role in real-time monitoring and control of individual wind turbines by enabling the control center operator to receive monitoring data as well as transmit control signals between wind turbines and the control center. Data transmission between the WPF and the control center can be divided into two types: uplink monitoring data and down link control data. The uplink monitoring data includes the real-time operation of wind turbines (SCADA system), structure health monitoring (SHM), measured data from meteorological towers, and protection data from intelligent electronic devices (IEDs) while the downlink control data between the control center and the WPF includes control commands. FIG. 13 shows a wireless network architecture for the WPF. It consists of three levels: wireless turbine area network, wireless farm area network, and control area network. Any of the wireless turbine area network, the wireless farm area network and the control area network may be monitored using any of the systems and methods described herein.

The systems and methods of the present disclosure may be applied to a farm level wind control system in the following ways: (a) Turbine to the farm-level control communications; (b) Turbine to turbine communications (farms of the future); and (c) Turbines communicated to each other and to the cloud directly.

The farm level control system may be designed to regulate the real power and either reactive power, system voltage or power factor of the entire wind farm. It achieves this by calculating the farm level real and reactive power set points, distributing these set points among all connected turbine on the farm and by coordinating and controlling fixed reactor and capacitor banks when the total VAR requirements for the farm cannot be supplied entirely by the reactive capability of the wind turbines themselves.

The Windfarm Control System may also be capable of performing power control functions such as curtailment, frequency droop, and ramp rate control for the Windfarm. It also aggregates data from each connected wind turbine in the farm and multiple grid measurement devices.

Wind farm controller has two main functionalities achieved through communicating with the wind turbine unites. A brief description of two main functions, real power and reactive power control are provided below.

(I) Real Power Control

1) Setpoint Generation:

a) Curtailment Setpoint—This power reference can come from multiple sources like Direct Marketing Interface (DMI), Utility Power Command, from distributed network control (DNC) in response to the reactive power capability of the plant or based on reserve power setpoint. A slew rate limiter is used to ensure smooth transitions.

b) Frequency Droop Control—This feature is used to help stabilize the grid frequency by modifying the power reference and is described in more detail below.

Figure 14:
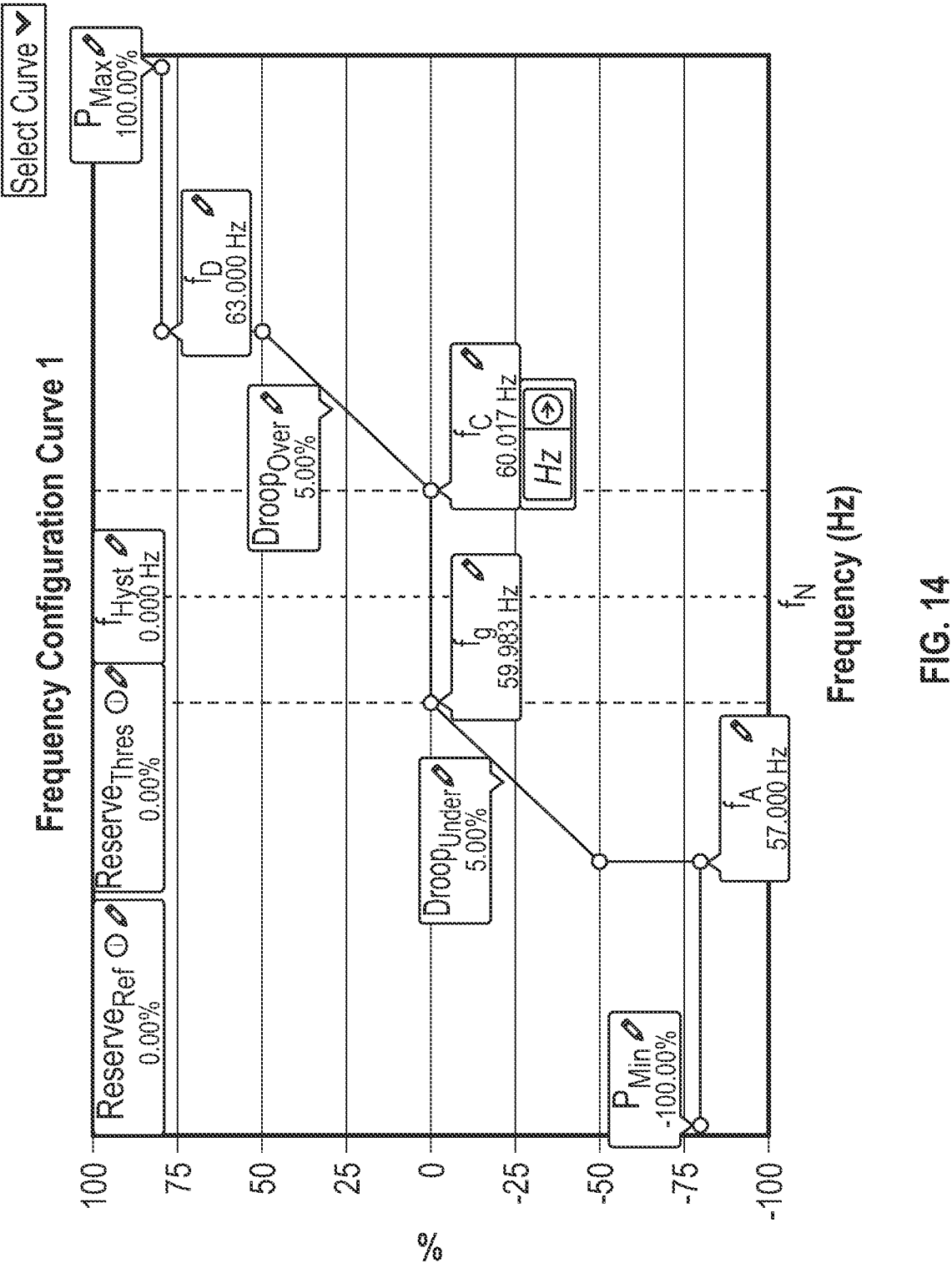
FIG. 14 illustrates a sample frequency droop curve for a typical wind power farm.

2) Frequency Droop Control:

The Frequency Droop is a special power control function to adjust the power output of a Windfarm based on a frequency excursion. In an over frequency event, the power output will be reduced. If the wind farm is curtailed or a reserve power level is configured, it's also possible to increase the power output during an under-frequency event. In a frequency excursion, the control generates a power reference signal (also called Base) based on either the actual power level or park possible power or a combination of both. A frequency deviation is calculated by subtracting plant frequency from the nominal frequency. A droop value is calculated based on the frequency deviation using a frequency configuration curve. A sample frequency configuration curve is shown in FIG. 14. It is subtracted from the Base to calculate the new power reference.

It must be appreciated that even though a lot of redundant frequency measurements, one from each connected turbine and from grid measurement device, are available, that redundancy is not utilized. The plant frequency is calculated by either averaging the frequency measurements obtained from all connected turbine or using the frequency measured by the grid measurement device based on a user parameter.

3) Power Regulator:

The PI Regulator receives a power reference that is determined as a min of curtailment setpoint and power frequency reference. A feed forward term is included as well as a compensation term that includes the power losses of the collector system and turbine transformer.

4) Power Command Distribution:

The power distribution function distributes commands to each turbine individually. There are two methods of power distribution available. The first method considers all online turbines for the curtailment scheme. Individual turbines get a command weighted on their possible power compared to the overall park possible power. The second method only commands as many turbines as needed to achieve the power reference.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. The described functionality may be implemented in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of example approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the disclosure described herein.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

The term automatic, as used herein, may include performance by a computer or machine without user intervention; for example, by instructions responsive to a predicate action by the computer or machine or other initiation mechanism. The word "example" is used herein to mean "serving as an example or illustration." Any aspect or design described herein as "example" is not necessarily to be construed as preferred or advantageous over other aspects or designs.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), unless the element is expressly recited using the phrase "means for" or, in the case of a method claim, the element is recited using the phrase "step for".

What is claimed is:

1. A system to protect an asset, the system comprising:
a plurality of monitoring nodes for the asset, each of the monitoring nodes generating a respective data stream of current monitoring node values in a time-domain; and
an anomaly detection computer coupled to the plurality of monitoring nodes, the anomaly detection computer configured to:
receive the respective data streams from each of the plurality of monitoring nodes,
synchronize, in real-time, the respective data streams by aligning monitoring node values using last available data from each monitoring node and by down-sampling higher-rate data streams to a uniform common sampling time,
automatically calculate and output at least one decision boundary based on processing, using an anomaly detection model during operation of the asset, of current feature vectors relative to sets of anomalous feature vectors, wherein the current feature vectors are representative of the synchronized respective data streams of current monitoring node values in the time-domain for each of the plurality of monitoring nodes, wherein the anomalous feature vectors are representative of anomalous operation of one or more of the plurality of monitoring nodes and/or anomalous operation of the asset,
determine whether the asset is behaving anomalously by comparing the current feature vectors to the at least one decision boundary,
determine, based on the comparison, a probability that a detected anomaly corresponds to a malfunction or failure of one or more monitoring nodes and a probability that the detected anomaly corresponds to an attack or a threat, and
generate an alert in response to a determination that the asset is behaving anomalously.

2. The system of claim 1, wherein the anomaly detection model comprises a plurality of sub-models, each sub-model operating concurrently on different temporal resolutions of the synchronized data streams.

3. The system of claim 1, wherein the anomaly detection computer is coupled wirelessly to the plurality of monitoring nodes.

4. The system of claim 1, wherein the anomaly detection model is configured to generate a set of anomalous feature vectors corresponding to a malfunction or failure of a first one or more of the monitoring nodes, and/or a set of anomalous features vectors corresponding to an attack or a threat on a second one or more of the monitoring nodes.

5. The system of claim 1, wherein the anomaly detection model comprises at least one sub-model based on historical operation of the plurality of monitoring nodes and the asset.

6. The system of claim 5, wherein the at least one sub-model is based on historically normal operation of the plurality of monitoring nodes and the asset.

7. The system of claim 6, further comprising a normal space data source storing sets of normal feature vectors for each of the plurality of monitoring nodes generated by the at least one sub-model based on historically normal operation of the plurality monitoring nodes and the asset.

8. The system of claim 1, wherein the at least one decision boundary is calculated in real-time relative to the operation of the plurality of monitoring nodes.

9. The system of claim 1, wherein each of the respective data streams is at a same frame rate as a collection sampling time of a set of sensors associated with its respective monitoring node.

10. The system of claim 1, wherein the anomaly detection model is built in state-space and using one of black-box and grey-box system identification techniques.

11. The system of claim 1, wherein the anomaly detection model is built automatically.

12. The system of claim 1, wherein the anomaly detection model is associated with a linear or non-linear model.

13. The system of claim 1, wherein the anomaly detection model is associated with an order automatically selected via a Hankel norm analysis.

14. The system of claim 13, wherein parameters of the anomaly detection model are estimated via a system identification method associated with at least one of: (i) Prediction Error ("PE") minimization, (ii) subspace methods, (iii) Subspace State Space System Identification ("N4SID"), and (iv) Eigen-system Realization Algorithm ("ERA") techniques.

15. The system of claim 1, wherein the anomaly detection model is associated with one of: (i) a Single-Input, Single-Output ("SISO") model, (ii) a Single-Input, Multi-Output ("SIMO") model, (ii) a Multi-Input, Single-Output ("MISO") model, and (iv) a Multi-Input, Multi-Output ("MIMO") model, (v) an actuator attack, (vi) a controller attack, (vii) a monitoring node attack, (viii) a plant state attack, (ix) spoofing, (x) financial damage, (xi) unit availability, (xii) a unit trip, (xiii) a loss of unit life, and (xiv) asset damage requiring at least one new part.

16. The system of claim 1, wherein the current feature vectors includes at least one of: (i) a local feature vector associated with a particular monitoring node, and (ii) a global feature vector associated with the plurality of monitoring nodes.

17. The system of claim 1, wherein the anomaly detection model includes an artificial intelligence model trained to dynamically update the at least one decision boundary based on temporal evolution of current feature vectors and that generates the at least one decision boundary based on recognition of patterns in the current feature vectors as being normal or anomalous.

18. The system of claim 17, wherein the artificial intelligence model further recognizes (i) patterns in the current feature vectors caused by a fault or malfunction at a respective monitoring node and (ii) patterns in the current feature vectors caused by a threat or an attack on a respective monitoring node and/or the asset.

* * * * *